United States Patent [19]

Franz et al.

[11] Patent Number: 4,705,983
[45] Date of Patent: Nov. 10, 1987

[54] EASILY SERVICEABLE ALTERNATOR, PARTICULARLY FOR VEHICULAR USE

[75] Inventors: Herbert Franz, Stuttgart; Gerhard Pflüger, Markgröningen, both of Fed. Rep. of Germany

[73] Assignee: Robert Bosch GmbH, Stuttgart, Fed. Rep. of Germany

[21] Appl. No.: 910,249

[22] Filed: Sep. 19, 1986

Related U.S. Application Data

[63] Continuation of Ser. No. 693,261, Jan. 22, 1985, abandoned.

[30] Foreign Application Priority Data

Mar. 23, 1984 [DE] Fed. Rep. of Germany ....... 3410759

[51] Int. Cl.⁴ ............................................. H02K 11/00
[52] U.S. Cl. .................................. 310/68 D; 310/89; 310/239
[58] Field of Search ................. 310/68 V, 68 D, 246, 310/247, 239, 89

[56] References Cited

U.S. PATENT DOCUMENTS

| | | | |
|---|---|---|---|
| 4,100,440 | 7/1978 | Binder | 310/68 DX |
| 4,155,023 | 5/1979 | Hageulocher | 310/246 |
| 4,546,280 | 10/1985 | Pflüger | 310/68 D |

*Primary Examiner*—Donovan F. Duggan
*Attorney, Agent, or Firm*—Frishauf, Holtz, Goodman & Woodward

[57] ABSTRACT

To improve resistance to vibration and shock, while permitting ready access for replacement of brushes of an alternator, the remote end shield (8) is formed as a reinforced plastic injection-molded or pressure-cast structure, integral with a hub for the remote bearing of the rotor and the brush holder for the brushes engaging slip rings (10, 11) on the rotor shaft. An opening (33) extending from approximately the radially outermost part of the brush holder to the end of the remote bearing plate permits access to the brushes for maintenance or replacement. The surface region of the end plate is formed with an engagement surface (35) against which a voltage regulator can be attached, having a projecting terminal blade electrically connected with one of the brushes by a compression spring and/or an eyelet rivet and a pigtail attached thereto.

8 Claims, 7 Drawing Figures

EASILY SERVICEABLE ALTERNATOR, PARTICULARLY FOR VEHICULAR USE

This application is a continuation of application Ser. No. 693,261, filed Jan. 22, 1985, now abandoned.

The present invention relates to an alternator, and more particularly to an alternator adapted to be driven by an automotive-type internal combustion engine, for example suitable for installation in vehicles.

BACKGROUND

Practically all modern automotive vehicles include alternators driven by the internal combustion engine (ICE) of the vehicle. The structure is such that a rotor shaft has one end located in a bearing shield from which the shaft projects. The projecting end is coupled to a drive pulley, which is driven by a V-belt from a similar pulley on the engine of the vehicle. The other end of the shaft is retained in a ball bearing, positioned in a second or inside bearing shield.

It has been proposed to simplify the alternator construction by making the inside bearing shield of insulating material, for example of a reinforced injection-molded plastic. This construction permits embedding connecting buses and connecting lines within the second or inside bearing shield.

THE INVENTION

It is an object to improve an alternator having a bearing shield made of plastic material by increasing its operating reliability and improving access to parts thereof subject to wear, so that maintenance is facilitated and exchange of wearing parts can be easily and rapidly effected.

Briefly, a brush holder is molded integrally with the plastic end shield and located inwardly thereof, the brush holder extending radially within the end shield. A radial opening is formed in the inner or remote end shield, extending essentially from a radially outer portion of the brush holder towards the outer circumference of the end wall of the end shield. This radial opening permits access to brushes retained within the brush holder for possible maintenance or replacement of the brushes which, usually, form the only parts subject to wear and requiring replacement within an alternator.

The radial opening formed in the inner or remote end shield enables removal of the brushes from their guide tubes within the brush holders without removing the end shield of the alternator from its assembly with the remaining portions of the alternator; thus, the brushes, which wear, can be readily replaced without disassembling the alternator structure.

The arrangement has the additional advantage that the region of the end shield adjacent the opening can be easily made flat or planar to form a bearing or attachment surface for a voltage regulator, which is then formed with connecting tabs or connecting blades extending into the alternator through the opening. Preferably, the alternator can be so pre-assembled with a brush that a connecting rail, extending from the voltage regulator, has the brush assembled thereto, with a compression spring positioned between the brush and the connecting tab or blade. The subassembly of voltage regulator-brush can then be slipped through the opening in position, with the brush being placed in the appropriate brush holder opening; or, alternatively, the brushes can be placed in position and the voltage regulator then secured to the remote end shield and electrically connected to the brushes by projecting blades.

DRAWINGS

DETAILED DESCRIPTION

Figure 1:
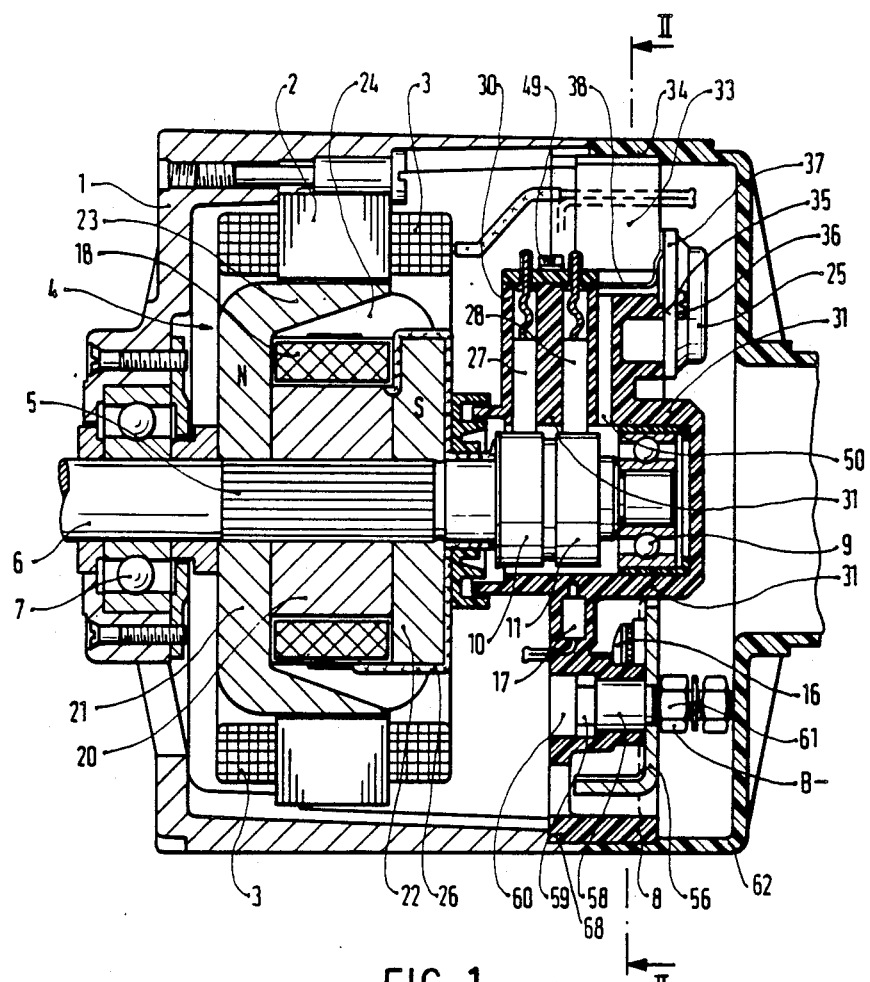
FIG. 1 is an axial cross-sectional view through an alternator destined for combination with an automotive internal combustion engine (ICE)

The alternator—see FIG. 1—has a drive side end shield or end bell 1, made for example as an aluminum pressure casting; a stator 2, formed of a plurality of stacked sheets, is wound with three-phase windings 3, located in radial slots (not shown) of the stator. A claw-pole rotor 4, seated on a shaft 5, is journalled in a bearing 7 at the drive side. The shaft 5 has a projecting end 6, extending beyond the drive side end shield 1, and carries a drive pulley and fan blade, as is customary in automotive-type alternators.

A second end shield or end plate 8 is located at the remote side of the drive side end shield 1. The remote shield 8 retains a second ball bearing 9 and a brush holder structure, for brushes in engagement with slip rings 10, 11, seated on the shaft 5 of the rotor. The remote end shield 8 is made of a reinforced plastic, for example injection-molded or pressure-cast plastic, reinforced with fiberglass.

Figure 4:
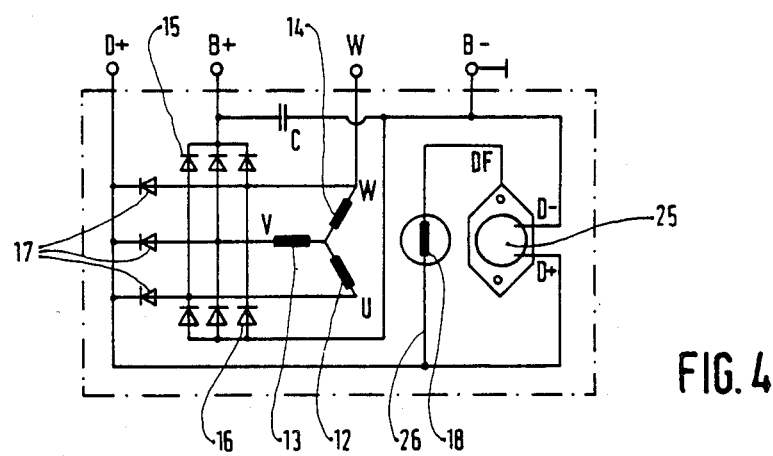
FIG. 4 is an electrical schematic diagram of the alternator-voltage regulator combination.

The electrical connection of the alternator is shown in FIG. 4: The three phase windings 12, 13, 14 of the three-phase winding 3 (FIG. 1) are star-connected. The winding terminals U, V, W are connected to respective terminals of power diode pairs 15, 16 forming, respectively, positive and negative rectifiers 15, 16. The positive rectifier 15 is connected to an output terminal B+; the negative rectifier 16 is connected to a common terminal B—, the terminal B— being connected to ground or vehicle chassis. The three phase windings 12, 13, 14 are additionally connected to one respective exciter diode 17 which has a common terminal D+, forming a test terminal, and, additionally, connected to one terminal of the field winding 18, shown schematically in FIG. 4.

The claw-pole rotor, excited by the exciter or field winding 18, is formed by a core 20, seated on the rotor shaft 5. The exciter winding 18 is wound about the core 20. Two pole disks 21, 22 are engaged axially against the core 20. Upon passage of current through the field winding 18, derived, in operation of the alternator, by the field current from the field diode 17, the two pole disks are oppositely magnetized with respect to each other. For example, pole disk 21 may form a North pole N, and pole disk 22 a south pole S. The two pole disks have six, first radially and then axially projecting claw poles 23, 24 cut or formed thereon. The claw poles are bent over by 90° and extend, when assembled in the alternator, parallel to the shaft 5 of the rotor. They are interdigited so that, on the rotor, an alternating sequence of North and South poles will appear at the circumference thereof.

Field current is supplied to the field winding 18 over a connecting line 26 (FIG. 4) which is coupled to the slip ring 10. Current is supplied by a brush 27 in engagement with the slip ring 10. Brush 27 is at at least the approximately the same voltage as the terminal B+ of the generator, being connected to the terminal D+. The field current then continues through the second slip ring 11, a second brush 28 in engagement with slip ring 11, then through the voltage regulator 25 and then to the D— terminal of the voltage regulator, which is connected, also, to the B— terminal of ground or chassis and of the alternator.

The electrical connection of the alternator is entirely conventional. The remote end shield 8 is a unitary plastic injection molding to which other elements of the alternator are molded-on, so that the end shield and other components form a single piece. This has the additional advantage that resistance to vibration and shock of the overall structure is enhanced since individual elements cannot become loose if they form part of a unitary molding or casting. According to the present invention, the remote shield 8 is formed as a single unitary injection or pressure-molded element made of insulating material which includes, as part of the molding, the brush holder 30 for the brushes 27, 28, and a central hub 31. The central hub 31 is provided to seat the remote ball bearing 9; the brush holder 30 extends in radial direction and is connected with the central hub 31. The central hub 31 extends axially beyond and over the slip rings towards a labyrinth seal, so that the two slip rings 10, 11 and the brushes can be retained in essentially dust-free atmosphere, enclosed within the hub, protected against sprays, humidity, moisture, or stray water which might enter the alternator through cooling air or sprays due to rotation of wheels of the vehicle in which the alternator is installed. The unitary structure of the end shield, brush holder and hub additionally provides for excellent stiffness and shape retention, both in the region of the hub 31 as well as in the region of the brush holder 30 due to the unitary construction of the end shield—brush holder—hub combination.

Alternators have a long life and the only elements subject to wear are the bearings—in which the wear can be readily controlled—and the brushes 28, 29 within brush holder sleeves of the brush holder 30. To permit ready replacement of the brushes, a radial opening 33 extending from the outer region of the brush holder to the outer circumference of the end shield 8 is provided, in accordance with the invention. The region between this opening and the hub 31 is formed, at the outside, with an engagement or clamping surface 35 to permit attachment of the voltage regulator 25 thereon. The voltage regulator 25 can be readily assembled by two self-tapping screws 36 on the end shield, and tightened against the engagement surface 35. The voltage regulator extends, in part, over the opening 33.

Figure 6:
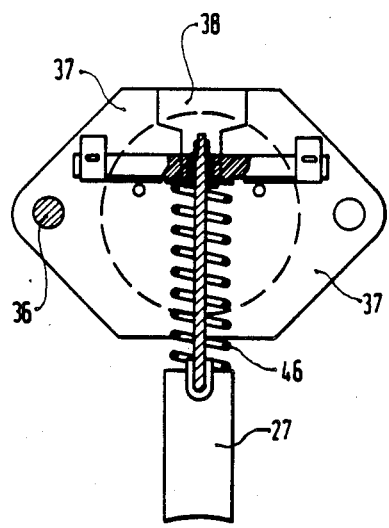
FIG. 6 is a end view of FIG. 5.
Figure 5:
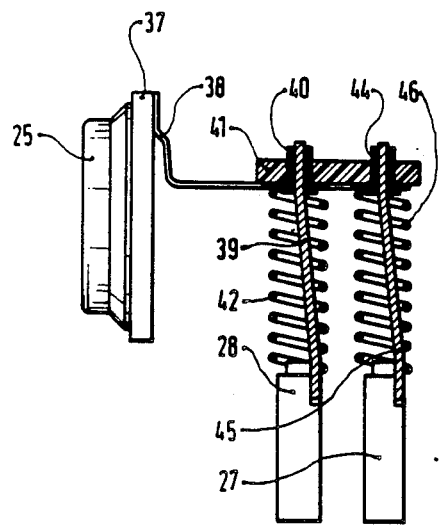
FIG. 5 is a side view of the association of a voltage regulator with the brushes.
Figure 7:
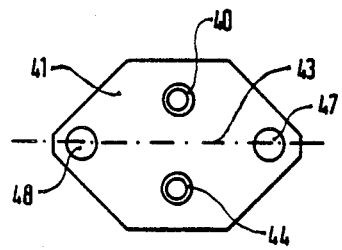
FIG. 7 is a top view of a common holding plate for brush terminals.

The voltage regulator 25 is formed with two angled-off metal strips or blades 38. The voltage regulator is tightened against the surface 35. It has a metal base 37 which is clamped against the surface 35. As best seen in FIGS. 5 and 6, the strip 38 is provided for the brush 28 which is closest to the remote end shield 8. The brush 28 has a connecting pigtail 39 which is fitted in an eyelet rivet 40 passing through the strip or blade 38. The eyelet further passes through a plate 41 of insulating material and forms a counter bearing for a compression spring 42, engaged between the brush 28 and the underside of the strip 38. The eyelet 40 and the end of the pigtail 39 are connected by a cross-pinch connection to be mechanically securely connected together; preferably, additionally, the pigtail and the eyelet are soldered together.

A second eyelet 44 is provided, located symmetrically to the longitudinal central plane 43 of the insulating plate 41. The second eyelet 44 is connected to the brush 27 by the pigtail 45 thereof, and forms an engagement surface for the compression spring 46 associated with the brush 27. Screws 49 pass through bores 47, 48, symmetrical to the plane 43, permitting attachment of the plate 41 at the free end surface of the brush holder 30.

A ventilating duct 50 is formed in the end shield structure 8, connecting the region of the hub 31 and the radial opening 33. Duct or channel 50 is provided for ventilation of the hollow space formed by the hub 31 and the region of operation of the slip rings 10, 11 and the brushes riding thereon.

Figure 2:
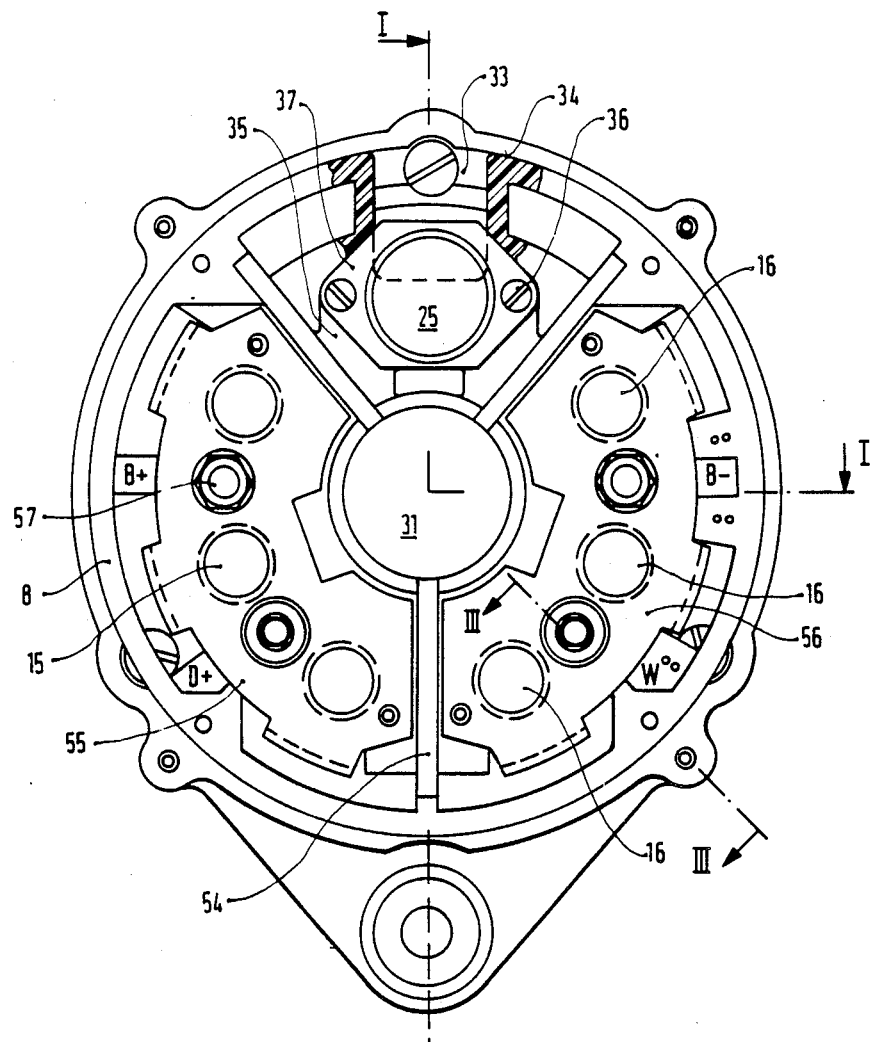
FIG. 2 is an end view along section II—II of FIG. 1, the section of FIG. 1 being taken along line I—I of FIG. 2; it should be noted that the section I—I is angled.

The axial end view of FIG. 2, illustrating the remote end shield 8, clearly shows the central hub 31 and the voltage regulator 25. FIG. 2 shows that, symmetrical to an axial central plane 53 of the generator, two reinforcement ribs 54 are provided, adjacent which two identical cooling plates 55, 56 are located, mirror-symmetrical with respect to each other. The cooling plates, each, carry respective rectifiers; the left cooling plate—in FIG. 2—that is, cooling plate 55, carries the three positive rectifiers 15 and a screw 57 forming the positive or B+ terminal, secured to the insulating remote shield 8. The right cooling plate 56 carries the three negative rectifiers 16. A clamping bolt 58 forms the negative connecting terminal B—. It is fitted with a hexagonal head 59 in an opening 60, extending parallel to the axis of the rotor, and retains the cooling plate 56 of the negative diode 16 by a nut 61.

The arrangement of the generator, and the particular construction of the end shiled 8 made of reinforced insulating material, results in substantial decrease of manufacturing costs, by combining a plurality of elements and structures in one structural unit, thus, additionally, contributing to resistance to shock, vibration, or malfunction due to loosening of speparate parts. The region of the connecting terminals 57, 58, likewise, insures easy assembly of the alternator in large-quantity mass production. The compact structure also enhances the resistance to vibration and shock, and the closed structure with a plastic end additionally increases the resistance to attack by corrosive fluids, such as road salt and the like, gases, such as salt-laden humid air, thus substantially increasing the lifetime of the alternator.

A plastic closing cap 62, with a suitable access opening for cooling air and connecting cables, is preferably provided, in form of a protective boot.

Various changes and modifications may be made within the scope of the inventive concept.

Figure 3:
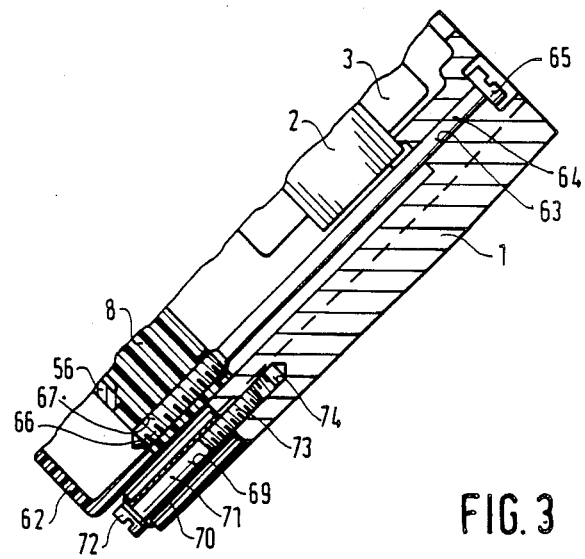
FIG. 3 is a section along line III—III of FIG. 2.

FIG. 3 additionally shows how the bearing shield 8 of insulating material, protected from the outside by a cap 62, is connected to the bearing shield 1 at the drive side. The stator 2 with the three phase winding 3 is located in the tubular region of the drive side bearing shield 1. The bearing shield 1 has, to this end, four longitudinal bores 63, through which, each, a tension screw 64 leads. Each of the tension screws 64 is engaged with a head 65 on the bearing shield 1 and has an outer thread 66 at its other end portion. The outer thread 66 of the tension screw 64 fits in corresponding tapped holes 67 in the insulating material bearing shield 8 which, further, carries the cooling plate 56 at the negative rectifier 16. By means of the tension screw 64, the insulating material bearing shield 8 is pulled against a shoulder 68 of this bearing shield 8.

The cover cap 62, which protects the bearing shield 8 of insulating material, is likewise secured to the bearing shield 1 and has four longitudinal bores 69, which are provided with metal sleeves 70, for reinforcement. An attachment screw 71 extends through these metal sleeves 70 which engage with their head 72 on the outside of the cover cap 62 and are screwed, with a threaded portion 73, into a blind tap hole 74 of the drive side bearing shield 1.

What is claimed is:

1. An easily serviceable alternator, particularly a vehicular-type alternator, having a drive-side end shield (1);

a stator (2,3) secured to the drive-side end shield;

a drive-side bearing (7) secured in the drive side end shield;

a remote end shield (8) of plastic material secured to the drive-side end shield (1);

a remote bearing (9) located in the remote end shield;

a rotor (4, 5, 18, 20–24) journalled between the drive-side bearing (7) and the remote bearing (9), the rotor including a rotor shaft and slip rings located on the rotor shaft and positioned close to the remote bearing, said alternator comprising, a brush holder (30) integral with the remote end shield (8) and located inwardly of the end shield, extending radially within the end shield;

brushes (27, 28) retained in the brush holder (30) and each pressed into electrical contact with one of said slip rings by a compression spring;

a central hub (31) integral with said end shield (8), extending over and beyond the slip rings (10,11) on the shaft (5) of the rotor, and securing said remote bearing (9);

an attachment surface (35) located on the remote end shield (8) and extending transversely to the axis of rotation of the shaft (5) of the rotor;

a voltage regulator (25) attached to said attachment surface (35); and a radial opening (33) formed in the remote end shield (8), extending essentially from a radially outer portion of the brush holder towards the outer circumference (34) of the end shield, and permitting direct access to said brushes (27, 28) retained in the brush holder (30), without detaching either of said voltage regulator (25) and said remote end shield (8), for possible maintenance or replacement of worn brushes to assure continued satisfactory electrical contact with said slip rings.

2. Alternator according to claim 1, wherein said voltage regulator (25) has electrical connecting terminals (38), secured to the attachment surface (35) and extending into said opening (33).

3. Alternator according to claim 2, wherein at least one of the electrical connecting terminals of the voltage regulator forms a carrier and connecting rail for a brush (28).

4. Alternator according to claim 3, wherein the electrical connecting terminal is an angled-off projecting tab or blade.

5. Alternator according to claim 4, further including a labyrinth seal at the free axial end portion of the hub (31) inwardly of the alternator.

6. Alternator according to claim 1, further including a venting duct (50) located adjacent the brush holder (30) and venting the space adjacent the ends of the brush holder close to the slip rings to said openings (33).

7. Alternator according to claim 1, further including a duct formed adjacent the brush holder (30) and venting the space of the central hub (31) in the region of the slip rings to the opening (33).

8. Alternator according to claim 1, further including a pair of identical cooling plates (55, 56) secured to the remote end shield and each supporting a plurality of rectifier diodes, one cooling shield forming a positive and the other cooling shield a negative output terminal for the alternator.

* * * * *